(12) United States Patent
Deeds

(10) Patent No.: US 7,248,900 B2
(45) Date of Patent: Jul. 24, 2007

(54) COMPOUND RING TUNES

(75) Inventor: Douglas Deeds, Bedford, TX (US)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 10/720,029

(22) Filed: Nov. 18, 2003

(65) Prior Publication Data

US 2005/0107128 A1    May 19, 2005

(51) Int. Cl.
*H04B 1/38*    (2006.01)
*H04M 1/00*    (2006.01)

(52) U.S. Cl. .............. 455/567; 455/414.1; 455/412.1; 455/412.2; 455/466; 455/514; 379/142.01; 379/373.02

(58) Field of Classification Search ............. 455/567, 455/414.1, 412.1, 2, 466, 514; 379/142.01, 379/373.02, 373.03
See application file for complete search history.

(56) References Cited

U.S. PATENT DOCUMENTS

| | | | | |
|---|---|---|---|---|
| 5,881,147 A | * | 3/1999 | Kim | 379/373.03 |
| 6,363,258 B1 | * | 3/2002 | Schmidt et al. | 455/514 |
| 6,366,791 B1 | * | 4/2002 | Lin et al. | 455/567 |
| 6,418,330 B1 | * | 7/2002 | Lee | 455/567 |
| 6,434,394 B1 | * | 8/2002 | Grundvig et al. | 455/463 |
| 6,570,983 B1 | * | 5/2003 | Speeney et al. | 379/373.02 |
| 7,020,497 B2 | * | 3/2006 | Deeds | 455/567 |
| 2002/0115456 A1 | * | 8/2002 | Narinen et al. | 455/466 |
| 2002/0176554 A1 | * | 11/2002 | Moss et al. | 379/142.01 |
| 2004/0219953 A1 | * | 11/2004 | Deeds | 455/567 |

* cited by examiner

*Primary Examiner*—Steve M. D'Agosta
(74) *Attorney, Agent, or Firm*—Alston & Bird LLP

(57) ABSTRACT

A manner of providing ring-tune alerts to announce the arrival of incoming communications at a communication device such as a mobile station operable in a wireless communication network. When notification an incoming communication arrives at the mobile station, the mobile station detects the type and origin of the communication and then composes a ring tune enhanced to provide incoming call information to the subscriber. The enhancement may include temporarily compounding the ring tune, tonal or stylistic enhancement, applying compound accompaniment, or applying tempo variation. The ring-tune components may be installed by the manufacturer or distributor of the instrument, or may be downloaded by the subscriber. The communication device may also be a personal computer operable to communicate through a communication network such as the Internet.

44 Claims, 5 Drawing Sheets

COMPOUND RING TUNES

FIELD OF THE INVENTION

The present invention relates generally to radio telephony, and more specifically to a method and system for using compound ring tunes to identify to the user of a mobile station communicating through wireless communications network certain characteristics of an incoming call.

BACKGROUND OF THE INVENTION

Mobile communication is rapidly increasing in popularity. Originally, mobile communication was available only in specialized applications such as ship-to-shore radio, police radio, or short range walkie-talkies. The advent of the modern mobile network, however, has made this form of communication much more available, practical, and affordable to large segments of the global population. In some locations, it is even more popular and reliable than standard wireline telephone systems. Naturally, the mobile nature of this form of communication has contributed to its popularity.

A mobile telecommunication system is one that uses a wireless channel to establish the connection between an individual subscriber and a communication network. The wireless network infrastructure is typically, though not necessarily a series of fixed switches, routers, and other hardware interconnected in a hierarchical fashion. In this sense, it may resemble a traditional wireline system. Calls to or from a subscriber are routed through this hardware to their destination. Calls to or from other networks leave and enter through gateways, so that the wireless network subscribers can connect to almost any other device connected to a publicly accessible telephone or computer network.

FIG. 1 is functional block diagram illustrating the relationship of selected components of a typical wireless communication network 100, such as one that might advantageously be used in accordance with an embodiment of the present invention. Base stations 105-110 are each shown to be connected with an antenna 111-116. Each antenna is intended to handle communications within a selected area, sometimes referred to as a cell. (For this reason the portable subscriber radios used in such a network are often called "cellular" or simply "cell" phones.) For example, in FIG. 1 cell phones 11, 12, and 13 are shown to be in communication with antennas 111, 112, and 113, via radio channels 1, 2, and 3, respectively.

The broken lines in FIG. 1 represent cell boundaries. These boundaries do not represent the precise range of their associated antennae, of course, and are not always regular in shape or consistent in size. And although only six cells are delineated, there are typically many more in the network coverage area. Cell phones may and often do move from cell to cell, and their network communications are generally transferred from one network antenna to another though a process called handover.

Base station controllers (BSCs) 120 and 125 are in communication with, and generally control the operations of base stations 105-107 and 108-110, respectively. The base station controllers are in turn connected with a mobile switching center (MSC) 130, which handles call routing and provides a connection to other network MSCs (not shown) and gateway MSCs such as G-MSC 135. A visitor location register, here VLR 140, maintains information relating to cell phones in the area services by the associated MSC. (A home location register (HLR) (not shown), may be provided to track the location and other information related to all network subscribers.)

The "wireless" part of a wireless network is therefore the connection between the subscriber and the network infrastructure though which calls to or from the subscriber are routed. This connection is normally made through radio channels, meaning that each subscriber will be equipped with a device having a radio transmitter and receiver. A mobile telephone is simply a radio for engaging in voice communication through a wireless network. Despite being radios, however, mobile telephones do not ordinarily communicate directly with one another but rather through the network. The network will employ at least one, any normally a great many base stations for connecting with subscriber devices.

At this point, it should also be noted that as the terms for radio telephones, such as "cellular (or cell) phone" and "mobile phone" are often used interchangeably, they will be treated as equivalent herein. Both, however, are a sub-group of a larger family of devices that also includes, for example, computers and personal digital assistants (PDAs) that are also capable of wireless radio communication in a radio network. In the context of the present invention, being able to communicate with a wireless network connotes the ability to receive a call intended for one or more mobile stations, although in some but not all embodiments the mobile station will require as well the ability to transmit and to initiate calls. This family of devices will for convenience be referred to as "mobile stations" (regardless of whether a particular device is actually moved about in normal operation).

FIG. 2 is a perspective view of a mobile station 200 such as one that might advantageously be used in accordance with an embodiment of the present invention. Mobile station 200 is a radio telecommunication device for use in a radio telecommunication network such as the one described above in reference to FIG. 1. The internal circuitry and components (not shown in FIG. 2) of mobile station 200 are contained in a casing, or enclosure, that typically includes two or more sections, which are sometimes referred to as covers. Referring to FIG. 2, mobile station 200 has an enclosure 201 that includes front cover 220 and back cover 222, which are removably fastened together at joint 205 when the phone is assembled. Attached battery 224 provides a portable power source, and antenna 226 aids in transmitting and receiving radio signals. A plurality of small openings 242 formed in front cover 220 serve as a port for the voice-communication speaker (not shown), which is mounted beneath them. At the opposite end of mobile station 200, microphone port 244 likewise permits entry of sound directed at the actual microphone (not shown) mounted inside. Power port 246 is for plugging in an external power adaptor and headphone port 248 for connecting an external headset and perhaps a microphone for hands-free operation.

The keypad 210 is a user interface including a plurality of openings, through which protrude keys such as alphanumeric keys 211, call control keys 212 (CALL) and 213 (END), scroll key 214 and function keys 215 and 216. As their names imply, these keys perform various duties in the phone's operation, with the alphanumeric keys 211 having a standard telephone keypad role, and the function and scroll keys used in connection with display 234. That is, the functions of the function keys and the scroll keys are variable and determined by the application state that the mobile phone is in, which is often translated into a word or icon displayed next to the key on display 234. Keys having a function that may be changed in this way are often called 'softkeys'. Other keys shown in FIG. 2 are power switch 219 and volume control key 217.

Display 234 is typically a liquid-crystal display (LCD) device. The LCD itself is protected by a plastic window pane 232, which is mounted to cover the display and protrude into window 230, an opening formed in front cover 220. As illustrated in FIG. 2, display 234 presents to the user such information as current softkey functions, telephone numbers, signal strength, and other information useful to the operation being performed. The protective window pane 232 is typically a component separate from the LCD, its chassis, and other portions of the internal assembly.

FIG. 3 is a flow diagram illustrating an exemplary method 300 of providing an incoming call alert according to the prior art. At START, it is presumed that a mobile station such as the one shown in FIG. 2 is operable to communicate with a wireless network such as the mobile station 200 shown in FIG. 1. The process begins when the alert, or ring-tune database is initialized (step 305). In most cases, this is done by the manufacturer, or by another along the distribution chain and before the instrument is provided to the user (sometimes also referred to as a wireless-service subscriber). At its most basic level this step involves programming the mobile station to ring when a call notification is received from the network. That is, once the network has identified that a call to one of its subscribers has been initiated and determined the current location of the subscriber, a call notification is sent that the mobile station must acknowledge before the call can actually be terminated. The ring tune is an alert that the mobile station will actuate to let the subscriber know that a call is being placed.

Assuming this basic case, that the ring tune is established when the subscriber first obtains the mobile station, certain user options are still available. For example, the user may wish to have a silent alert for incoming call notification. This option is useful when knowledge of calls is desired even though the user is in a location or setting where an audible alert would be inappropriate. The silent alert is normally accomplished using a vibrating function resident in the mobile station, although a light on the mobile station or other visible device may be used as well. Of course, the silent and the audio alert may be used at the same time. In another example, the audio alert function may be adjusted from loud to soft, or set to sound once but not continuously. Typically, these alert preferences may be changed from time to time by the subscriber, and may form part of a 'profile' or set of preferences, that the user may optionally select as a group. (For simplicity, however, in the context of the present disclosure the set of preferences constituting the profile may contain only a single element.)

The next step 310 in the process therefore is to receive a profile selection. Again, the profile may be set by the manufacturer as a default selection, and is in this sense received before the subscriber first obtains the mobile station. In practice, however, many subscribers frequently use their ability to switch from one profile to the other. The process continues as the user actually receives notification from the network that an incoming call is being received (step 315). Note that this notification may come directly from the subscriber's network, or if the subscriber is outside of its network coverage area then through whatever network is being used to complete the call. When an incoming call is detected, the appropriate ring is generated (step 320) according to the current profile selection. The ring tune is generated until the user accepts the call or until a predetermined ring time has elapsed.

Contemporary mobile stations are frequently provided with the ability to generate a variety of different ring tunes, each having a different pattern. The user is able to select one, and to change their selection as desired. Often such selections are assigned to a profile, as mentioned above. Whatever ring tune has been selected is then used when an incoming call is received. To switch ring tunes, the user simply selects another from those available or switches profiles. In some applications, the user may even select a number of ring tunes and associate them with different callers or call groups. In this way, for example, a caller may be able to discern from the different ring whether an incoming call is business-related or personal.

As alluded to above, however, mobile stations may be used for functions other than ordinary phone calls. They may also be used to send and receive text or voice messages that are delivered when the message target is available (and are not frustrated by lack of immediate availability). Facsimile transmission may also be accomplished, as can other types of data communication such as retrieval of Internet-accessible Web sites. A subscriber who uses their mobile station for both business and personal communications (as many do) may be inundated with calls that, if announced identically, represent a significant distraction as they are sorted through. Even assigning diverse ring tones to certain call groups may not provide a satisfactory call-management aid; there are only so many tunes available and where there are many their selected association may be difficult to remember. Needed therefore is a way to provide incoming-call alerts that are capable of provide the user with information regarding the incoming call that is as comprehensive as possible. The present invention provides just such a solution.

SUMMARY OF THE INVENTION

In one aspect, the present invention is a method of providing an enhanced ring-tune alert that provides information to a subscriber regarding the communication characteristics of an incoming call, the method including the steps of detecting an incoming call and the communication characteristics, such as call type and call origin associated with the call, associating one or more of these characteristics with a specific ring-tune enhancement, and generating an enhanced ring-tune by applying the enhancement to a base ring tune. Note the enhancement, and for that matter the base ring tune may be audible or may include or even be limited to other alert effects such as vibration.

Varying types of ring-tune enhancement may be used, either alone or in combination. In a temporally-compounded enhanced ring tune, a secondary ring-tune segment associated with a particular communication characteristic of the incoming call is appended to the beginning or the end (or both) of the base ring tune, and of course even more than two such appendages may be applied where appropriate. A tonal enhancement involves modifying or adjusting the quality of the base ring tune, such as by changing voices, without altering its recognizable nature. Applying an accompaniment enhancement, on the other hand, involves the addition (or in some cases the subtraction) of accompanying parts to the base ring tune. A stylistic enhancement may also be used so that a recognizable base tune is annunciated in a style that can be separately recognized and provide an indication to the user of one or more communication characteristics. A tempo enhancement involves varying the tempo of the base ring tune, or of an otherwise enhanced ring tune, to identify a communication characteristic. As should be apparent, these various enhancements may also be used in combination with each other.

Ring-tune enhancements may be provided with a mobile station to the subscriber, or may be downloaded to the mobile station though a wireless connection or to another device connected to an Internet based server. In some instances existing mobile stations may be modified at services centers to be able to operate according to the present invention.

In another aspect, the present invention is an apparatus for providing an alert to the user of a mobile station including a ring-tune database for storing ring-tune enhancements, a detector for detecting incoming calls and determining communication characteristics associated with them, and a controller for associating incoming-call communication characteristics with ring tune and directing a ring-tune generator to generate a ring-tune alert based on the association.

In yet another aspect, the present invention is a system for providing an alert including at least one mobile station operable to communicate with the infrastructure of a wireless network through a network base station, including a ring-tune database accessible by the base station, which monitor calls directed at the mobile station and determines their communication characteristics so that a ring-tune controller may associate the communication characteristics with one or more ring-tune enhancements from the ring tune database and direct a ring-tune generator to generate an enhanced ring tune. In one embodiment, the ring-tune database and ring-tune controller are part of the network infrastructure, and provide instructions to a ring-tune generator located in a mobile station in order to effect application of the appropriate enhancement based on the network's knowledge of the communication characteristics off a call directed to the mobile station.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1-5, discussed herein, and the various embodiments used to describe the present invention are by way of illustration only, and should not be construed to limit the scope of the invention. Those skilled in the art will understand the principles of the present invention may be implemented in any similar mobile stations, in addition to those specifically discussed herein.

The present invention presents an innovative manner of effecting call alerts to provide easily understandable information regarding the nature of incoming calls. Various embodiments for practicing the present invention will now be described.

Figure 1:
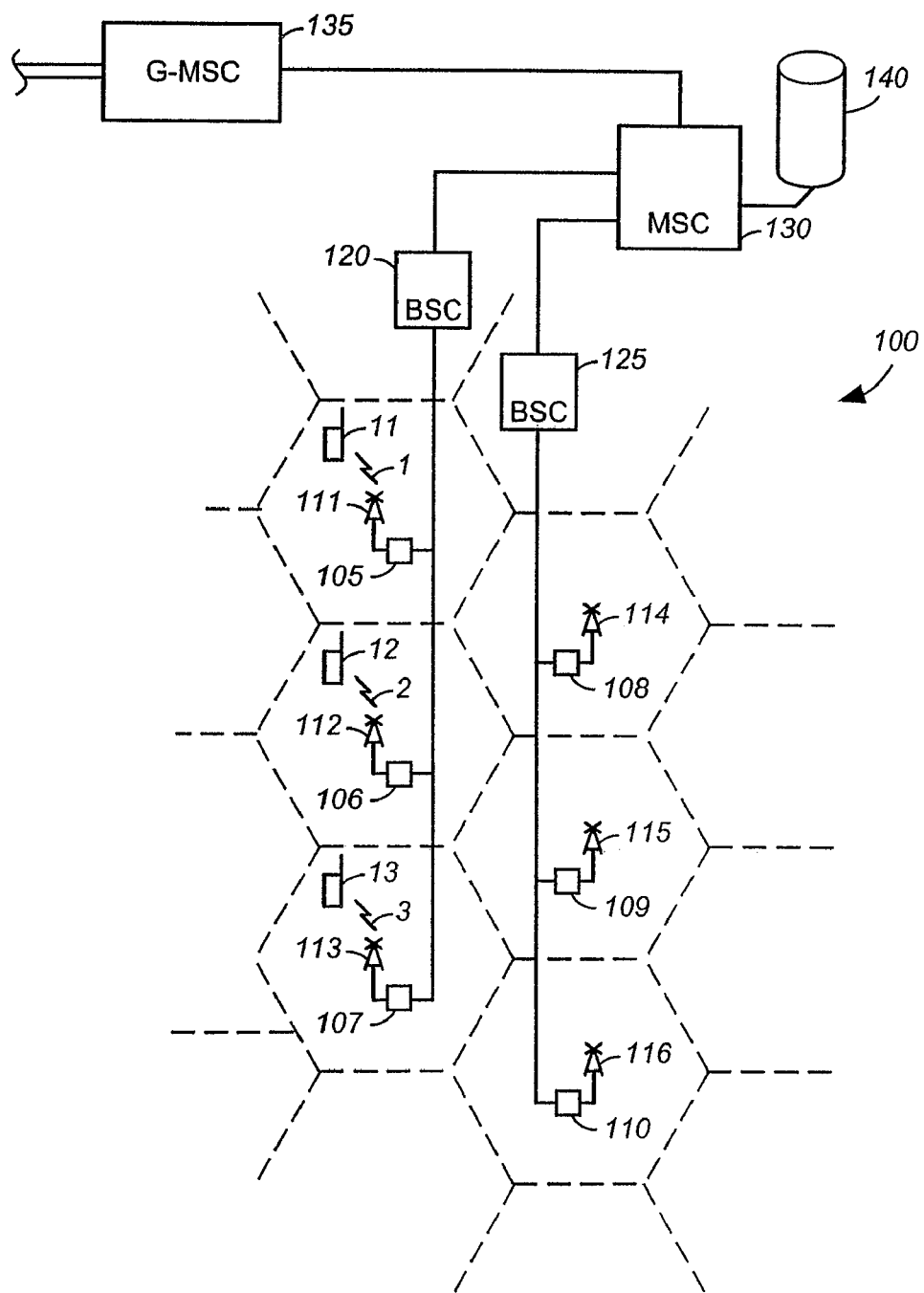
FIG. 1 is functional block diagram illustrating the relationship of selected components of a typical wireless communication network, such as one that might advantageously be used in accordance with an embodiment of the present invention.
Figure 2:
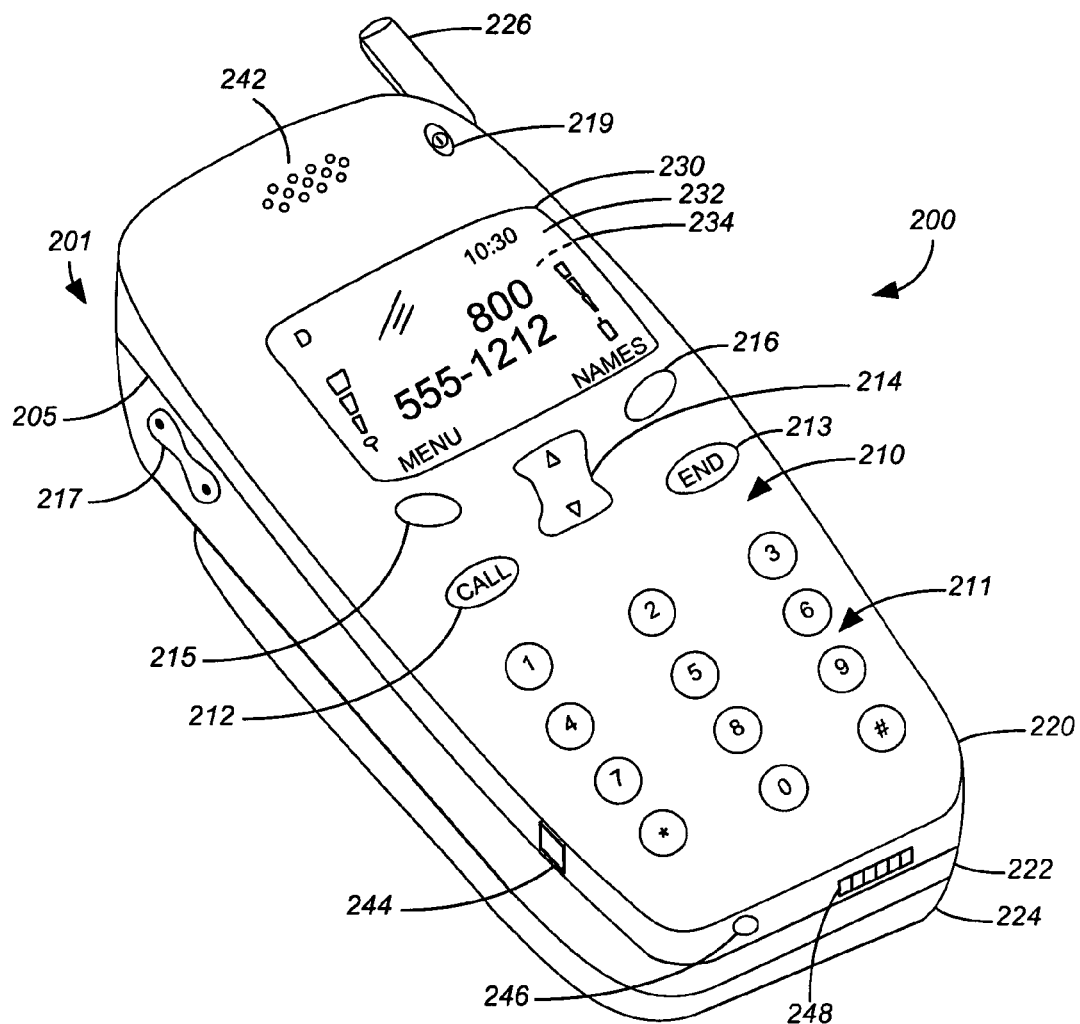
FIG. 2 is a perspective view of a mobile station such as one that might advantageously be used in accordance with an embodiment of the present invention.
Figure 3:
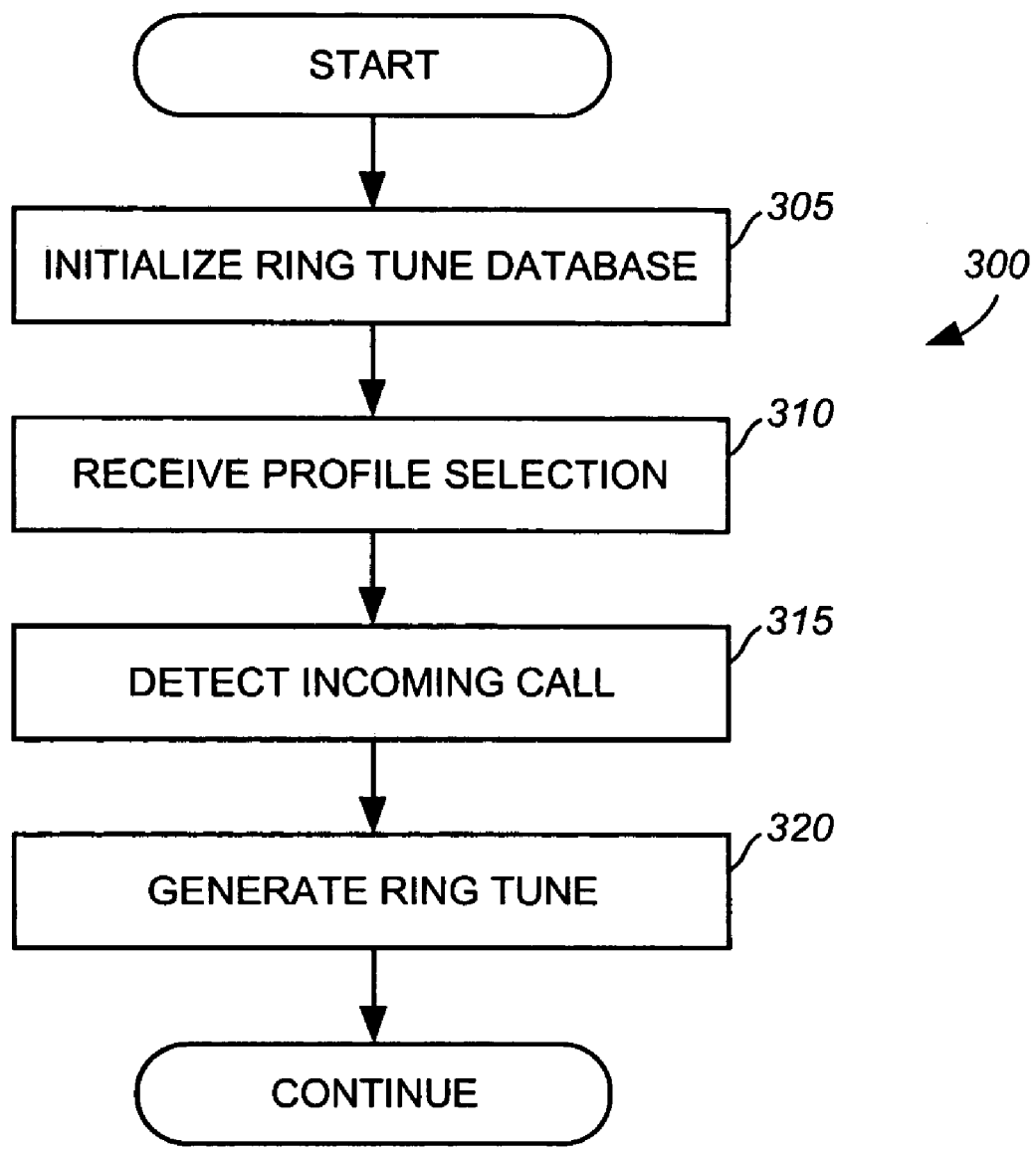
FIG. 3 is a flow diagram illustrating an exemplary method of providing an incoming call alert according to the prior art.
Figure 4:
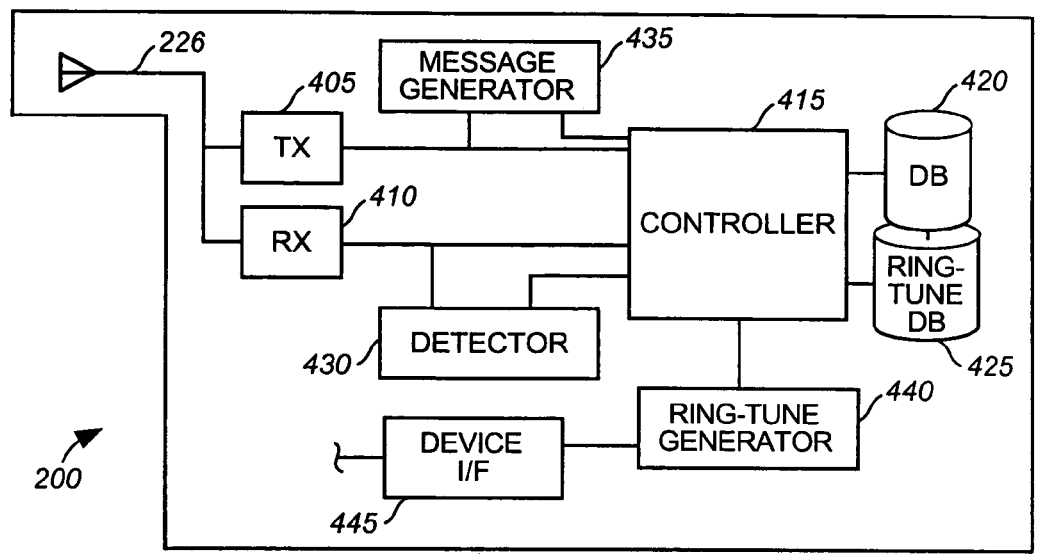
FIG. 4 is a functional block diagram of a mobile station illustrating selected components for use in providing enhanced ring tunes in accordance with an embodiment of the present invention.

FIG. 4 is a functional block diagram of mobile station 200 of FIG. 2 illustrating selected internal components for use in providing enhanced ring tunes in accordance with an embodiment of the present invention. Mobile station 200 includes transmit circuitry 405 and receive circuitry 410 for sending and receiving a variety of different types of communications through antenna 226. Although for simplicity only one set of circuitry is shown for each of these respective functions, however, the mobile station 200 may be capable of communicating in a plurality of ways, such as with a wireless network and also with nearby Bluetooth devices.

A controller 415 is provided for controlling the operation of transmit circuitry 410 and receive circuitry 415 and other operations of mobile station 200 as well. In an alternate embodiment (not shown) separate coordinated controllers may be provided to deal with selected functions. Database 420 is a memory storage device and in this illustration is intended to include both short-term and long-term memory functions. Database 420, for example, may be used to store contact information such as the telephone numbers of individuals and organizations, and other associated information such as addresses, email addresses, facsimile numbers, and so forth.

Ring-tune database 425 may also be incorporated into database 420, but in FIG. 4 is shown separately for the purposes of illustration. In accordance with the present invention, ring-tune database 425 is used for storing ring-tune components. These ring-tune components (such as a base ring tune and ring-tune enhancements), will now be described in more detail.

A ring tune is a device, usually but not necessarily audible, that is used to announce the receipt on an incoming call. If audible, the sound is produced by a speaker in, or connected with the mobile station. Preferably separate speakers are used for reproducing voice information and for producing ring tones, but this disclosure focuses on the speaker that annunciates ring-tones and it is immaterial whether it is used for voice as well. Receipt of an incoming call is signaled by a network notification message that is ordinarily acknowledged by the mobile station. Some form of acknowledgement is desirable as the network will otherwise have some difficulty determining that the target mobile station is operating in a given area and powered up to received a call.

In accordance with the embodiment illustrated in FIG. 4, an incoming call detector 430 is provided to detect the receipt of an incoming call notification. Directed by controller 415, incoming-call detector determines as much information regarding the incoming call as it is able, for example the type of communication being received and the identity of the caller. (Of course it is able to do so at this point only when such information is provided in the call notification.) Message generator 435 will then generate a return message acknowledging that the incoming-call notification message has been received. Ring-tune generator 440, which may be incorporated with controller 415 or may be a separate component, then generates a ring-tune alert appropriate to the communication information. The generation of a ring-tune, in accordance with an embodiment of the present invention, involves preparing whatever signal or instructions are required to cause the annunciation of the desired ring-tune. Device interface 445 provides the interface between the ring-tune generator 440 and the device or devices that will be performing the annunciation. These devices (not shown) typically include a speaker, often a separate one from that used for voice communication, and a vibration generator.

Incoming-call information may include the type and source of the call. The communication type simply indicates the form of communication being attempted, for example a standard telephone call. Or the incoming communication may be a page message, a short-message service (SMS) message, or some other form of text or voice message. In contrast to a telephone call, however, these types of communication may be accepted for delivery automatically instead of waiting for the subscriber's indication of willingness to have the call terminated (that is, connected). The communication type may also be a facsimile transmission or an email message. These recited types, of course, are illustrative rather then exclusive, and there may be others as well. It is expected though not required that the communication type will be determinable from the notification message because the recipient device will have to at some point be prepared to receive and process the communication itself.

The communication source indicates the origin of the intended communication. The origin may be determinable as to the specific device or person calling, or may be generally determined as with calls from a certain company or area. The communication source will generally be determined in one of a number of ways. First, the notification message may include standard caller-ID information such as a telephone number. In that case, the caller-ID information identifies the source device specifically, and may be used to identify the caller as well. That is, the caller-ID information may be compared to information stored in database 420, which will associate identifiers such as telephone numbers or email addresses with names of persons or organizations. Even if there is no such stored information, of course, the caller-ID information provides at least some indication of the call source, and may be more comprehensive than simply a telephone number alone.

Another way of obtaining call-source information is from the incoming-call notification itself if it in fact contains more detailed source information than what is provided with caller-ID. In this case, a distinctive enhanced ring tune may be generated from the information provided based on the ring-tune information stored in ring-tune database 425. In one embodiment, a caller is able to provide this information for inclusion in the incoming-call notification message so that the correct enhanced ring-tune results even if they are calling from an unknown telephone number. Third, a query may be formulated by message generator 435 to ask for more information about incoming communication if the system permits such inquiries. In this case, the mobile station may store any received information in the database 420 for future reference and to eliminate the need for redundant future inquiries. Storage of information retrieved in this way may be accomplished automatically, without any further action by the subscriber, or alternately such information may be retained only if the subscriber responds affirmatively when queried.

However the incoming-communication information is obtained, the ring-tune generator 425 generates a specific ring tune based upon the information available to it. In accordance with the present invention, the ring tune generator 425 is operable to assemble enhanced ring tunes in order to efficiently signal to the user known information regarding the incoming call. The various enhancements will now be described in more detail. In this description, the term 'base ring tune' will be used to describe a ring that would typically be used absent application of the present invention. This may be but is not necessarily the default ring initially set by the manufacturer or seller. The base ring tune may be used on its own we well, for example where no incoming-call information is available. In addition, there may be any number of base ring tunes that are selectable by the user.

A first type of enhanced ring tune is the temporally-compounded ring. In this embodiment, a preamble may be appended to the ring tune in order to indicate something about the nature of the call. This preamble is a secondary ring tune that is distinguishable from the base. For example, a specific communication type may always cause generation of a certain preamble, regardless of its origin. In this way the user immediately knows that the incoming call is an email as opposed to a phone call. The advantage of employing the distinguishing preamble is that the base ring tune itself may be varied to indicate other call information, such as origin. Naturally, the preamble could also be used to identify the origin and the base ring tone varied to indicate type. In another embodiment, the secondary ring tune could be appended to sound after the base ring tune.

Generally speaking, ring tunes are cyclic, with a chosen sound sequence repeating itself at regular intervals. Where the base ring tune operates in this manner, the preamble could be generated to append to each repetition. Alternately, it may only be appended to the first ring and the mobile station would thereafter use only the base ring. In yet another alternative, the preamble could be appended periodically to the base ring tune, skipping a predetermined number of rings before being appended again. Note that as used herein, "appended" refers to the use of a secondary ring tune that is conjoined or concatenated with the base ring tune, usually either before or after ("preamble" is set before, and an "appendix" after). Note also, however, that the secondary ring tune may also be inserted within the base ring tune, in essence interrupting it and dividing it into two or more pieces.

A second type of ring-tune enhancement involves applying tonal variation to the base ring tune according to the known communication information. Subtle variations may be available but difficult for the average user to distinguish from one another. A more pronounced variation may be applied by changing the voice (or voices) used for annunciating the ring tone. Voices can be thought if in terms of different musical instruments even though the mobile station is only using its ring-tone speaker to replicate the sound characteristics of various instruments. For example, a trumpet sound may signal an incoming telephone call, while a flute indicates that an SMS message is being received. The different voices may also be used to signal call origin as well; a saxophone indicating a communication from a spouse, for example. More general categories could also be used, such as an organ sound to signal the arrival of work-related email.

The enhancements described above may of course be used in combination to provide more variety for applying ring-tune labels to certain classes of communication. In addition, there is no requirement that a single scheme be used. That is, a series of preambles may be programmed for indicating the communication types of business-related information, one preamble for faxes, another for email, and so forth, but no preamble would be applied to communications from family members, who would instead simply be identified by using different voices with no regard to communication type.

Needless to say, the system of ring tune enhancements of the present invention could get very involved, and trying to uniquely identify all variations may become so complex that any advantage is lost. In a preferred embodiment, however, the enhancements could be applied one at a time. The user would then over time become used to particular enhancements before adding more. Adjustments could be made to accommodate changing conditions or needs. Some users would of course be more adept at remembering the distinctions than others, so each user is able to create a ring-tune scheme that they are comfortable with. Unless explicitly claimed, however, there is no requirement that all of the enhancements described above be available to each or any subscriber.

In some instances no correlation between incoming-call characteristics and ring-tune enhancements may be found. This may be due to the absence of any determinable characteristics, or may simply occur because no association with the received characteristics has been requested. Although the un-enhanced base ring tone could be generated for such instances, in a preferred embodiment an enhanced ring tone is assigned so that the subscriber is made aware that an attempt to provide information has been made. Different enhanced ring tones may be assigned, for example one to incoming calls providing communication characteristics, and another to those supplying no communication-characteristic information or to those refusing to provide such information when requested. By the same token, certain enhanced ring tones may be associated with incoming calls for which some, though less than all desirable information is detectable.

In another embodiment (not shown), the present invention is a ring-tune alert scheme for use on a computing device such as a personal computer (PC). While a PC may fall within the definition of a "mobile station" as that term is used herein, it is also described here separately for clarity. Although PC users are generally aware when email is downloading through a dial up connection, the ring-tune scheme of the present invention may be implemented to announce the arrival of a text message or VoIP call, or of an email arriving through a continually-maintained connection. In this embodiment, the ring-tune may be played at the computer itself, or at a remote device accessible to the user.

Figure 5:
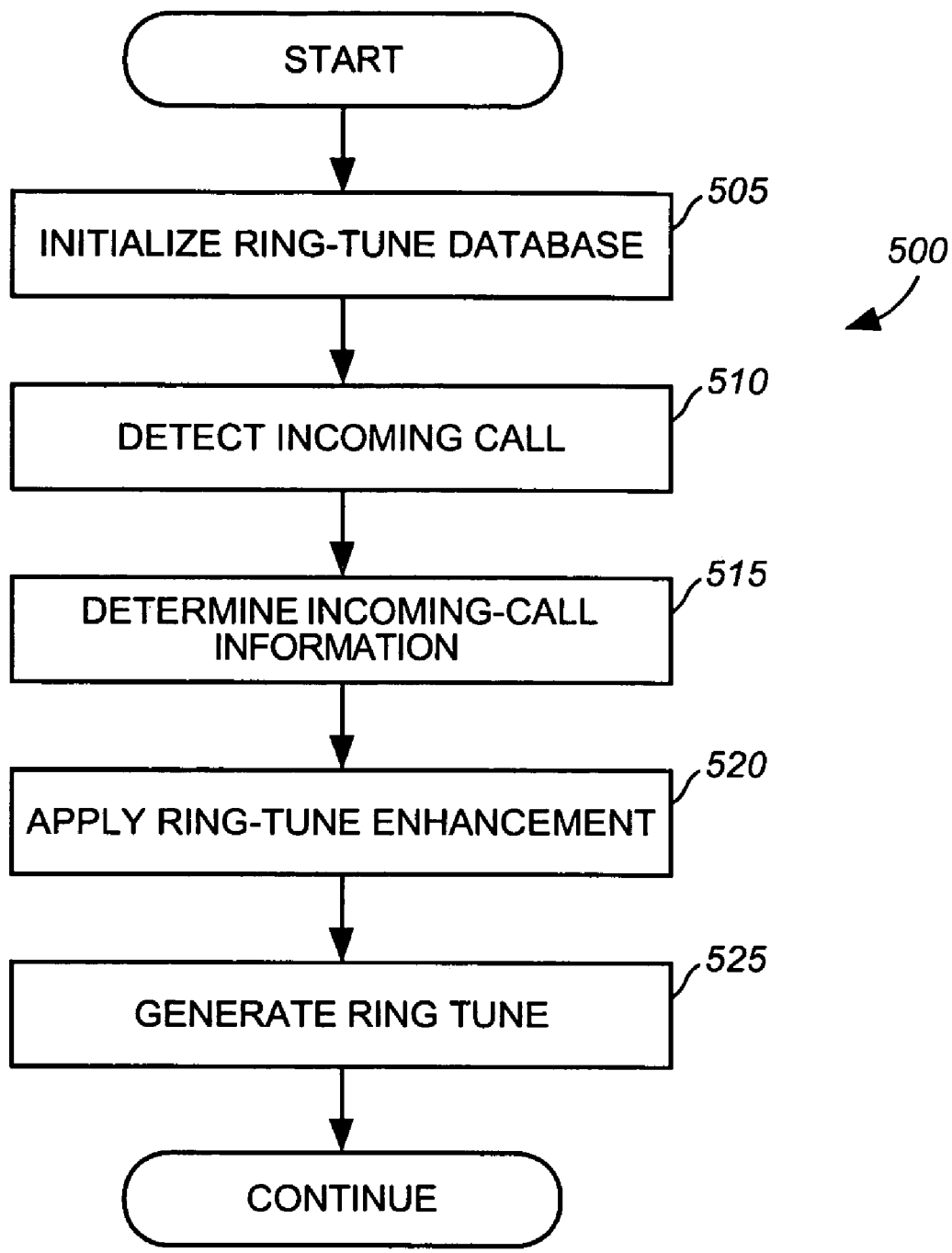
FIG. 5 is a flow diagram illustrating a method of providing a ring-tune alert according to an embodiment of the present invention.

FIG. 5 is a flow chart illustrating a method 500 of providing a ring-tune alert according to an embodiment of the present invention. At Start it is presumed that a mobile station operable in accordance with the present invention is operating in a wireless network. The ring-tune database 425 is initialized (step 505) so that appropriate ring-tune enhancements can be made. This step may be performed when the telephone is manufactured or by the user, and should be alterable to accommodate the user's changing needs. In operation, the detector 430 then waits until an incoming call is detected (step 510). Incoming-communication information is then determined (step 515), which can be done in a number of ways as described above. An appropriate enhancement is then applied to the base ring tune (step 520) and an enhanced ring tune is generated (step 525). The process then continues and awaits the detection of another incoming communication.

The preferred descriptions are of preferred examples for implementing the invention, and the scope of the invention should not necessarily be limited by this description. Rather, the scope of the present invention is defined by the following claims.

What is claimed is:

1. A method for providing a ring-tune alert in a communication device operable to receive communications via a communication network, said method comprising:
   detecting an incoming communication;
   determining at least one communication characteristic of the incoming communication;
   associating a first ring-tune enhancement with the at least one communication characteristic; and
   generating a composite ring-tune alert by appending the first ring tune enhancement to a base ring tune,
   wherein the at least one communication characteristic comprises a plurality of communication characteristics and associating a predetermined ring-tune enhancement with each of a plurality of the plurality of communication characteristics,
   wherein the first ring-tune enhancement comprises appending a secondary ring-tune to the base ring tune.

2. The method of claim 1, further comprising the step of annunciating the enhanced ring tune.

3. The method of claim 2, wherein the annunciation is audible.

4. The method of claim 1, further comprising the step of initializing a ring-tune database by storing the first ring-tune enhancement and the base ring tune.

5. The method of claim 4, wherein the initializing step comprises downloading ring-tune information from an Internet-based server.

6. The method of claim 1, wherein the secondary ring-tune is a preamble appended in front of the base ring tune.

7. The method of claim 1, wherein the first ring-tune enhancement comprises the addition of at least one accompaniment part to the base ring tune.

8. The method of claim 1, wherein the first ring-tune enhancement comprises application of a tonal adjustment to the base ring tune.

9. The method of claim 1, wherein the first ring-tune enhancement comprises application of a stylistic adjustment to the base ring tune.

10. The method of claim 1, wherein the base ring tone is one of a plurality of base ring tunes selectable for application.

11. The method of claim 10, wherein the selection of a base ring tune from the plurality of base ring tunes is a function of the at least one communication characteristic of the incoming communication.

12. The method of claim 1, wherein this step of determining at least one communication characteristic comprises the step of transmitting a request for communication-characteristic information.

13. The method of claim 12, further comprising the step of receiving a response to the request for communication-characteristic information.

14. The method of claim 13, wherein the response contains communication-characteristic information and further comprising the step of storing the communication-characteristic information for future use in associating ring-tune enhancements with communication characteristics.

15. The method of claim 1, wherein the communication device is a mobile station operable within a wireless communication network.

16. The method of claim 1, wherein the communication device is a computer operable to receive communications via a connection to the Internet.

17. The method of claim 1, wherein the base ring tune comprises a plurality of base ring tunes, and wherein the first ring tune is only appended to a first base ring tune among the plurality of base ring tunes which are periodically rung.

18. The method of claim 1, wherein the composite ring-tune comprises inserting the first ring tune into the base ring tune, the base ring tune being divided into a plurality of pieces.

19. A method for providing a ring-tune alert in a communication device operable to receive communications via a communication network, said method comprising:
   detecting an incoming communication;
   determining at least one communication characteristic of the incoming communication;
   associating a first ring-tune enhancement with the at least one communication characteristic;
   generating a composite ring-tune alert by appending the first ring tune enhancement to a base ring tune; and
   generating a designated ring-tune alert for indicating the arrival of an incoming communication for which no communication characteristic could be associated with a ring-tune enhancement.

20. For use in a mobile station operable in a wireless communication network, an improvement of apparatus for alerting a user to the arrival of an incoming call notification, said apparatus comprising:
   a ring-tune database for storing at least one ring-tune enhancement;
   a detector for detecting communication characteristics, if any, associated with an incoming call;
   a ring-tune controller for associating a detected communication characteristic with the at least one ring tune enhancement stored in the ring-tune database; and
   a ring-tune generator for generating an enhanced composite ring tune by appending the at least one ring-tune enhancement to a base ring tune,
   wherein the detected communication characteristic comprises a plurality of communication characteristics and wherein the ring-tune generator associates a predetermined ring-tune enhancement with each of a plurality of the plurality of communication characteristics.

21. The apparatus of claim 20, wherein the mobile station comprises a vibration generator, and wherein the first ring-tune enhancement comprises the addition of a vibrating effect to the base ring-tune.

22. The apparatus of claim 20, wherein the least one ring tune enhancement stored in the ring-tune database comprises a plurality of ring-tune enhancements for associating with communication characteristics.

23. The apparatus of claim 20, wherein the detector detects the communication characteristics by querying a user of a terminal to provide additional information relating to a previously received incoming call.

24. The apparatus of claim 20, wherein the base ring tune comprises a plurality of base ring tunes, and wherein the at least one ring-tune is only appended to a first base ring tune among the plurality of base ring tunes which are periodically rung.

25. The apparatus of claim 20, wherein the enhanced composite ring tune comprises inserting the at least one ring-tune into the base ring tune, the base ring tune being divided into a plurality of pieces.

26. A system for use in a wireless communication network having network infrastructure, for alerting a network subscriber to the arrival of an incoming call notification, said system comprising:
   at least one mobile station for use by the subscriber;
   a base station for handling wireless communications between the at least one mobile station and the network infrastructure;
   a ring-tune database assessable to the base station for storing at least one ring-tune enhancement;
   a detector for detecting communication characteristics, if any, associated with a network communication directed at the at least one mobile station;
   a ring-tune controller for associating a detected communication characteristic with the at least one ring tune enhancement stored in the ring-tune database; and
   a ring-tune generator for generating an enhanced composite ring tune including the at least one ring-tune enhancement appended to a base ring tune,
   wherein the detected communication characteristic comprises a plurality of communication characteristics and wherein the ring-tune generator associates a predetermined ring-tune enhancement with each of a plurality of communication characteristics.

27. The system of claim 26, wherein the ring-tune generator is resident in the at least one mobile station and wherein the ring tune controller is not located in the mobile station, and further comprising means for the ring-tune controller to direct the ring-tune generator, via wireless communication, to generate the enhanced ring tone.

28. The system of claim 26, wherein the at least one enhancement is a tempo enhancement.

29. The system of claim 28, wherein the system monitors the number of incoming-call notifications from the same source, and wherein the tempo enhancement is a function of the number of unsuccessful call attempts made by the same source.

30. The system of claim 26, wherein the base ring tune comprises a plurality of base ring tunes, and wherein the at least one ring-tune is only appended to a first base ring tune among the plurality of base ring tunes which are periodically rung.

31. The system of claim 26, wherein the enhanced composite ring tune comprises inserting the at least one ring-tune into the base ring tune, the base ring tune being divided into a plurality of pieces.

32. The system of claim 26, wherein the base ring tune comprises a plurality of ring tunes, and wherein the at least one ring-tune is appended periodically to the plurality of base ring tunes after a predetermined number of rings.

33. A computer program product for providing a ring-tune alert in a communication device operable to receive communications via a communication network, said computer program product comprising a computer-usable storage medium having computer-readable program code portions stored therein, the computer-readable program code portions comprising:
   a first executable code portion for detecting an incoming communication;
   a second executable code portion for determining at least one communication characteristic of the incoming communication;
   a third executable code portion for associating a first ring-tune enhancement with the at least one communication characteristic; and
   a fourth executable code portion for generating a composite ring-tune alert by appending the first ring tune enhancement to a base ring tune,
   wherein the at least one communication characteristic comprises a plurality of communication characteristics, and further comprising a fifth executable code portion for associating a predetermined ring-tune enhancement with each of a plurality of the plurality of communication characteristics.

34. The computer program product of claim 33, wherein the communication device is a mobile station operable within a wireless communication network.

35. The computer program product of claim 33, wherein the communication device is a computer operable to receive communications via a connection to the Internet.

36. The computer program product of claim 33, wherein the first ring-tune enhancement comprises appending a secondary ring tune to the base ring tune.

37. The computer program product of claim 33, wherein the first ring-tune enhancement comprises application of a tonal adjustment to the base ring tune.

38. The computer program product of claim 33, wherein the first ring-tune enhancement comprises the addition of at least one accompaniment part the base ring tune.

39. The computer program product of claim 33, wherein the first ring-tune enhancement comprises application of a stylistic adjustment to the base ring tune.

40. The computer program product of claim 23, wherein the base ring tune comprises a plurality of base ring tunes, and wherein the first ring tune is only appended to a first base ring tune among the plurality of base ring tunes which are periodically rung.

41. The computer program product of claim 33, wherein the composite ring-tune comprises inserting the first ring tune into the base ring tune, the base ring tune being divided into a plurality of pieces.

42. The computer program product of claim 33, wherein the base ring tune comprises a plurality of ring tunes, and wherein the first ring tune is appended periodically to the plurality of base ring tunes after a predetermined number of rings.

43. A method for providing a ring-tune alert in a communication device operable to receive communications via a communication network, said method comprising:
  detecting an incoming communication;
  determining at least one communication characteristic of the incoming communication;
  associating a first ring-tune enhancement with the at least one communication characteristic; and
  generating a composite ring-tune alert by appending the first ring tune enhancement to a base ring tune, and
  wherein the base ring tune comprises a plurality of ring tunes, and wherein the first ring tune is appended periodically to the plurality of base ring tunes after a predetermined number of rings.

44. For use in a mobile station operable in a wireless communication network, an improvement of apparatus for alerting a user to the arrival of an incoming call notification, said apparatus comprising:
  a ring-tune database for storing at least one ring-tune enhancement;
  a detector for detecting communication characteristics, if any, associated with an incoming call;
  a ring-tune controller for associating a detected communication characteristic with the at least one ring tune enhancement stored in the ring-tune database; and
  a ring-tune generator for generating an enhanced composite ring tune by appending the at least one ring-tune enhancement to a base ring tune, and
  wherein the base ring tune comprises a plurality of ring tunes, and wherein the at least one ring-tune is appended periodically to the plurality of base ring tunes after a predetermined number of rings.

* * * * *